United States Patent Office 3,579,562
Patented May 18, 1971

3,579,562
PROCESS FOR HYDROFORMYLATING UNSATURATED ESTERS OR NITRILES
Wolfgang Weigert, Offenbach am Main, Germany, assignor to Deutsche Gold- und Silber-Scheideanstalt vormals Roessler, Frankfurt am Main, Germany
No Drawing. Filed Dec. 17, 1965, Ser. No. 514,648
Claims priority, application Germany, Dec. 22, 1964, D 46,116; May 22, 1965, D 47,334
Int. Cl. C07c *121/34, 69/66*
U.S. Cl. 260—465.1                                14 Claims

ABSTRACT OF THE DISCLOSURE

Methacrylic acid esters and nitrile are hydroformylated in the presence of a rhodium catalyst. α-formyl products predominate when reacting below 100° C. and β-formyl products predominate when reacting above 100° C.

---

The present invention relates to a process for the production of hydroformylated products from unsaturated compounds by reaction of such compounds with CO and $H_2$ in the presence of catalysts and certain novel compounds obtained therewith.

It is known that compounds containing an ethylenic C=C double bond react with hydrogen and carbon monoxide at raised temperatures and pressures in the presence of catalysts to form aldehydes. If the substituents attached to the carbon atoms of such C=C double bond are not symmetric the resulting product in general will be a mixture of isomeric aldehydes as the formyl group can add to one or the other of the carbon atoms of such C=C double bond. However, usually such a mixture is not desired and many efforts have been made to influence the hydroformylation reaction by varying the conditions thereof so that the desired aldehyde is obtained as the main product. However, previously no generally applicable measures could be found which would influence the hydroformylation in the desired manner.

It is also known that the hydroformylation of unsaturated compounds which already contain a functional group is considerably more difficult and that in general lower yields are obtained.

Methacrylic acid esters and methacrylonitrile can be hydroformylated in the presence of iridium and/or ruthenium and/or preferably rhodium or their compounds or preferably their oxides at temperatures between about 50° and 250° C. at pressures of about 40 to 1000 atmospheres, if desired, in the presence of an inert solvent and, if desired, in the presence of an activator with at least 1 mol of CO and at least 1 mol of $H_2$ per mol of starting material.

The carboxyl group can be esterified with a mono- or polyhydric alcohol which can be of aromatic, aliphatic, cycloaliphatic, araliphatic or heterocyclic nature.

It was furthermore found that depending upon the temperature employed one can selectively obtain either the α or β formyl product such as, for example either α or β formyl isobutyric acid methyl ester or nitrile when asymmetric olefinic starting materials are employed. If products are desired which primarily contain the α-formyl compounds the hydroformylation should be carried out at temperatures below 100° C. When β-formyl compounds are desired the temperature employed should be above 100° C. In the middle temperature range both products are obtained in about equal quantities. As a rule, better yields are obtained at lower temperatures than at higher temperatures as no side reactions causing decreased yields such as polymerization or hydrogenation of the starting material tend to occur. When the process is carried out at lower temperature, the time required for the reaction increases, even if not to a troublesome extent. If such increased reaction periods are undesired it is expedient to work in the presence of so-called activators. Basic substances and especially heterocyclic bases have proved satisfactory therefor. The use of metal complexes such as nickel boride or, preferably, palladium zeolite are especially advantageous.

Among the starting materials the nitriles and esters of methacrylic acid and, especially, methyl methacrylate are most preferred. Known stabilizers, such as hydroquinone, can be added to the starting materials. Of the catalysts indicated, rhodium or respectively its salts or oxides are most preferred as their use is simple and they lead to the highest yields.

When metallic rhodium, ruthenium or iridium or their salts or oxides, such as, the halides, nitrates, sulfates, dioxides or sesquioxides and the like are heated in the presence of CO at moderately raised pressures the corresponding carbonyl compound is easily formed, which under the conditions of the hydroformylation, that is, in the presence of hydrogen under pressure easily yield carbonyl hydride which actually represents the active catalyst. This heating can be effected in the absence of the unsaturated starting materials but in the hydroformylation reaction in order to avoid the aforementioned side reactions. The unsaturated starting material is then directly introduced into the reaction so that the hydroformylation occurs. Therefore separate production of a metal carbonyl or a metal carbonyl hydride which are difficult to handle is not necessary as these catalytic compounds in themselves are produced during the synthesis reaction. It is also possible to use catalyst mixtures such as mixtures of rhodium and cobalt compounds or other known hydroformylation catalysts. Expediently, such mixed catalysts should contain rhodium in a ratio of about 1000:1 to 1:1000 with reference to the other active catalysts.

The quantity of catalyst used can be very low and can be adjusted with respect to the reaction temperature employed. At higher temperatures low quantities and at lower temperatures higher quantities of catalyst are employed. Even small traces of catalyst can effect a conversion. The quantities used advantageously are between 0.0001 and about 5 mol percent and preferably are about 0.02 mol percent. In general one mol of each of $H_2$ and CO are employed per mol of unsaturated starting material but larger quantities can be employed without disadvantage. Also the ratio of CO to $H_2$ can be varied within wide limits. It is advantageous, however, to maintain a molar ratio of 1:1.

In carrying out the process according to the invention all solvents may be employed which are stable and inert under the conditions of the hydroformylation reaction such as, for example, aliphatic, cycloaliphatic and aromatic hydrocarbons, esters and ethers.

The process according to the invention can be carried out continuously with special advantage. In such operation the unsaturated starting material as well as the CO and $H_2$ are pumped into the high pressure gas cycle, which passes through a reaction tube, a heat exchanger and a pressure separator, in a quantity corresponding to the reaction product and non-converted starting material which are removed from the cycle in the pressure separator. The liquid mixture removed by such separator is easily separated into the unconverted starting material and the individual reaction products by distillation. The recovered starting material is returned to the gas cycle.

In view of the number of functional groups contained in the hydroformylation products obtained according to the invention, they are well suited as intermediates in organic synthesis, as well as, as components of synthetic resins. For instance, the aldehyde group can be hydrogenated to the hydroxy and the ester or nitrile group can be hydrolysed to carboxyl groups to give hydroxy carboxylic acids which can be polycondensed to give polyesters. Upon hydrogenation in the presence of ammonia, amino acids, such as, aminopyvalic acid, form α-formyl isobutyric acid, which is known as a starting material for a polyamide having good properties are obtained. α-Formyl isobutyric acid nitrile also, for example, can be hydrogenated in the presence of ammonia to produce, 2,2-dimethyl propylidene diamine which can serve as a starting material for polyamides. β-Formyl isobutyric acid can be hydrogenated with ring closure to form 3-methyl pyrrolidone. Upon oxidation and hydrolysis α-formyl isobutyric acid ester will form dimethyl malonic acid which as a difunctional acid can be processed to polyesters or polyamides.

Besides this, the products obtained according to the invention can be used as cross linking agents.

The following examples will serve to illustrate the invention.

EXAMPLE 1

2 liters of ethyl acetate and 0.9 g. of rhodium sesquioxide were placed in a 5 liter autoclave of V4A steel provided with electric heating and a magnetic stirrer. CO was then pumped in until a gauge pressure of 10 atmospheres was reached. The contents were then heated for 15 minutes to 150° C. while stirring. Thereafter the temperature was reduced to 70° C. and 900 g. of methyl methacrylate pumped in over a period of about 45 minutes. Then the pressure was raised to a gauge pressure of 250 atmospheres by the addition of CO and $H_2$ in a molar ratio of 1:1. The reaction set in immediately as could be noticed by the drop in the gas pressure. The pressure was maintained at 200–250 atmospheres by replenishment of the CO and $H_2$ consumed. The end of the reaction was indicated by cessation of the CO and $H_2$ take up. The unconsumed CO and $H_2$ were blown off and after cooling the reaction solution was processed by distillation after the catalyst had been filtered off. After the solvent had been distilled off the residue was rectified in a rectification column 1 meter long. 863 g. of α-formyl-isobutyric acid methyl ester (yield 73.8% of theory; boiling point 49–50° C. at 12 torr) and 196.6 g. of β-formyl-isobutyric acid methyl ester (yield 16.8% of theory; boiling point 70° C. at 12 torr) were obtained. The total yield of hydroformylation product was 90.6%. The reaction product consisted of 81.5% of the α-formyl compound and 18.5% of the β-formyl compound. The products were obtained in a purity of over 98%.

EXAMPLE 2

The procedure of Example 1 was repeated with the modification that the contents of the autoclave were first heated for 15 minutes to 150° C. and then cooled at 130° C. at which temperature the pressure was raised to a gauge pressure 250 atmospheres by pumping in a 1:1 molar mixture of CO and $H_2$ and that the 900 g. of methyl methacrylate were only then pumped in over a period of about 2 hours while replenishing the CO and $H_2$. The reaction started immediately when the methyl methacrylate was supplied to the autoclave and was practically completed when its addition had ended. The reaction mixture was processed as in Example 1. An oxoester mixture was obtained in a yield of 85%, 19.7% of which consisted of α-formyl-isobutyric acid methyl ester and 80.3% of which consisted of β-formyl-isobutyric acid methyl ester. In addition about 5% of hydroxy carboxylic esters were formed.

The procedures of Examples 1 and 2 were repeated at various temperatures, the procedure of Example 1 being used for temperatures below 100° C. and the procedure of Example 2 being used for temperatures equal to or higher than 100° C. At reaction temperatures below 100° C. yields of over 90% were obtained in each instance. The highest yield was 97.3% at a reaction temperature of 90° C.

EXAMPLE 3

The procedure of Example 2 was repeated using ethylene glycol dimethacrylate instead of the methyl methacrylate and a reaction temperature of 120° C. The conversion was 90.6% with about a 75% yield of the reaction product which boiled at 150° C. at 0.1 torr and consisted of the three theoretically possible ethylene glycol bis-(formyl isobutyric acid) esters. The bis-dimethyl acetals corresponding to this product boil in the range of 160–175° C. at 0.2 torr.

I claim:

1. A method of producing hydroformylated products from an unsaturated compound of the group consisting of a lower alkyl methacrylate, ethylene glycol dimethacrylate and methacrylonitrile which comprises contacting said unsaturated compound with CO and $H_2$ in a quantity of at least 1 mol of each mol of unsaturated compound and a catalytically effective amount of a catalyst consisting essentially of rhodium, its oxides and its salts capable of forming rhodium carbonyl under the hydroformylation conditions as the sole catalyst at a temperature of about 50° to 250° C. and a pressure of about 40 to 1,000 atmospheres.

2. A process according to claim 1 wherein the catalyst is selected from the group consisting of rhodium, rhodium oxides, rhodium halides, rhodium nitrates and rhodium sulfates as the sole catalyst.

3. A method according to claim 1 in which the temperature employed is maintained below 100° C. whereby an α-formyl product is obtained as the main hydroformylated product.

4. A method according to claim 1 in which the temperature employed is maintained above 100° C. whereby a β-formyl product is obtained as the main hydroformylated product.

5. A method according to claim 1 in which the quantity of catalyst employed is about 0.0001 to 5 mol percent per mol of starting unsaturated compound.

6. A method according to claim 5 in which said unsaturated compound is a lower alkyl ester of methacrylic acid.

7. A method according to claim 6 in which the ester is methyl methacrylate.

8. A method according to claim 5 in which said unsaturated compound is ethylene glycol dimethacrylate.

9. A method according to claim 5 in which said unsaturated compound is methacrylonitrile.

10. A method according to claim 5 wherein the catalyst is a rhodium oxide.

11. A method according to claim 1 wherein the unsaturated compound is selected from the group consisting of methyl methacrylate, ethylene glycol dimethacrylate and methacrylonitrile.

12. A method according to claim 1 wherein the catalyst consists of a member of the group consisting of rhodium, rhodium sesquioxide and rhodium dioxide.

13. A method according to claim 12 wherein the unsaturated compound is selected from the group consisting of methyl methacrylate, ethylene glycol dimethacrylate and methacrylonitrile.

14. A method according to claim 13 wherein the temperature employed is maintaind below 100° C. and recovering an α-formyl product as the main hydroformylated product.

References Cited

UNITED STATES PATENTS

| | | | |
|---|---|---|---|
| 2,437,600 | 3/1948 | Gresham et al. | 260—604 |
| 2,409,086 | 10/1946 | Walker | 260—465.8 |
| 3,007,931 | 11/1961 | Simpson et al. | 260—465.9X |
| 3,239,566 | 3/1966 | Slaugh et al. | 260—604 |
| 3,446,839 | 5/1969 | Falbe et al. | 260—438X |
| 2,542,767 | 2/1951 | Gresham et al. | 260—483 |
| 2,880,241 | 3/1959 | Hughes | 260—604 |

FOREIGN PATENTS

| | | | |
|---|---|---|---|
| 953,605 | 12/1956 | Germany | 260—483 |

JOSEPH P. BRUST, Primary Examiner

U.S. Cl. X.R.

260—483